Patented Oct. 8, 1946

2,408,782

UNITED STATES PATENT OFFICE 2,408,782

METHOD OF MAKING A VARNISH

Louis René Joseph Kientz, Paris, France; vested in the Alien Property Custodian

No Drawing. Application February 26, 1942, Serial No. 432,484. In France March 26, 1941

4 Claims. (Cl. 260—30)

The object of the present invention is to prepare a varnish, with a base of phenol formaldehyde resin, possessing in particular remarkable properties of suppleness, adhesion and stability with respect to chemical and physical agents. In particular, this varnish produces, by application thereof onto an underlying base, a film which is capable of lending itself without scaling to deformations produced by shocks or by temperature variations, while presenting great hardness. Such properties permit the utilization of the varnish obtained according to the invention as both an effective and lasting coating or facing to protect metallic or other objects against the destructive or corrosive action of the atmosphere or chemical agents to which they are exposed.

The invention relates more particularly to a method for preparing the above defined varnish. This method essentially consists in preparing a phenol formaldehyde resin by condensation of a phenol with formaldehyde in an alkaline medium and in the presence of a catalyser constituted by a salt of an organic acid having at least one hydroxylic function, then in mixing the resin thus obtained, preferably in the presence of organic solvents, with a resinous product resulting from the acid treatment of aromatic compounds having a high molecular weight and presenting well developed lateral chains.

A mixture is thus obtained which, after having been possibly diluted by means of organic solvents appropriate for the utilization of the considered varnish, becomes, by a subsequent condensation, a plastic mass having the above mentioned properties.

In practice, this condensation will take place on the very object which is to be coated after the mixture has been applied onto the object.

Except for the presence of the salt of an organic acid acting as a catalyser, which condition constitutes one of the characteristics of the invention, the preparation of the phenol-formaldehyde resin in an alkaline medium may be effected by the usual methods. The alkaline medium will preferably be constituted by a volatile alkali, such as ammonia for example, or by an organic amine such as ethylene diamine.

The salts of the organic acids having at least one hydroxylic function which may be utilized as catalysers in this reaction are particularly the salts of citric, tartaric, malonic and lactic acids.

As examples of aromatic compounds having a high molecular weight and a developed lateral chain, the resinous derivatives of which may be utilized for being mixed with the phenol-formaldehyde resin, coumarone ($C_8H_6O$) and indene ($C_9H_8$) which are to be found in the distillation products of coal and of petroleum may be utilized. It is known that, as a result of an acid treatment, these substances yield resinous products the constitution of which is not very well defined, but which are characterized in particular by their resistance to acids and to alkalis. Such products are now well known in industry and their preparation does not need to be specially described.

Before they are mixed, the phenol formaldehyde resin and the resin of the aromatic compound may be dissolved, respectively, in solvents suitable for each one of them, it being necessary to choose the solvents in such a way that they be miscible one with the other. As solvents for the phenol formaldehyde resin, ethyl alcohol, acetone, or a mixture of one of these with butanol may be used for example. As a solvent for the resin of the aromatic compound, an aromatic hydrocarbon such as benzene may be utilized.

It should be noted that, in all cases, the mixture of the two above defined resins is not soluble in vegetable and mineral oils either hot or cold.

It has been discovered, according to the invention, that the condensation of both resins can be effected only if these products are mixed in proportions comprised within well determined limits. The proportion of phenol formaldehyde resin entering into the composition of the mixture must lie between 75 and 50% by weight, and the proportion of the resinous product derived from the aromatic compound between 25 and 50%.

As has been said above the condensation of the two resinous products thus mixed is effected on the underlying base object coated or veneered with this mixture. This reaction takes place as a result of a heating operation at a temperature which may vary from 180 to 450° C., which baking operation is prolonged for a period of time which may vary, dependent upon the thickness of the coating, the size of the coated object and the temperature chosen, from a few minutes to 2 hours.

The coating obtained after this treatment is insoluble in the usual organic solvents.

As has been mentioned above those properties of suppleness, adherence and physical and chemical stability of the varnish according to the invention render it particularly suitable for use as a coating or facing for protecting metallic or other objects against the destructive or corrosive action of atmospheric or chemical agents to which they are exposed.

Thus, for example, this varnish may be advantageously utilized to replace, in a large number of cases, methods for protecting iron or other metals by tin-plating, galvanizing or other metallising processes. Among other applications of this kind, it may be used in the constitution of protective coatings for the inner and outer surfaces of tin cans for canned food or of metallic containers the object of which is to contain chemical products; for parts exposed to the inclemency of the weather and accessible only with difficulty, thereby requiring a resisting coating, capable of long wear, which condition is usually obtained by galvanising, as is the case for example for certain parts of the supporting towers or framework of electric transmission feeders; for metallic parts or objects utilized in the spinning and dyeing industries which parts or objects are subjected to the action of chemical reagents.

The varnish according to the invention may also be utilized as a coating or facing product for objects made of magnesium or of magnesium alloys instead of having recourse to chemical mordanting, generally utilized for protecting these objects.

Here is a non limitative example of how the invention can be embodied:

On the one hand, 3 gr. of tartaric acid are dissolved in 7 gr. of water and the solution obtained is mixed with 50 gr. of ammonia at 20% and 200 gr. of formaldehyde at 40%.

On the other hand, 250 gr. of phenol are melted in a glass balloon shaped container and the above described preparation is added thereto. The whole is mixed and the container provided with a reflux condenser is placed in a bath of oil heated to 130–140° C.

The reaction starts off rather violently. The products of this reaction separate little by little into two layers. When this separation is completed the upper layer is decanted then the resin thus obtained is dehydrated under a vacuum and it is diluted in a mixture of 125 grs. of acetone and 125 grs. of butanol.

Finally, this resin solution is mixed with a solution of 90 grs. of coumarone resin (fusion point 80–81° C.) in 250 grs. of pure benzene. A varnish is thus obtained which is ready for use. This varnish may be applied preferably by immersion or by spraying. The final condensation is effected by a baking operation under those conditions of temperature and of time already indicated.

What I claim is:

1. The method of making a baking varnish which comprises resinifying 250 grams of phenol and 200 grams of formaldehyde 40% solution with heat in the presence of the product of fifty grams of 20% ammonia and three grams of tartaric acid, decanting the resin, diluting it with a mixture of acetone and butanol and mixing it with a solution of 90 grams of coumarone resin of 80–81° C. fusion point, in 250 grams of benzene.

2. The method of obtaining a varnish with phenol formaldehyde base which comprises (1) forming a resin by heating 250 parts of phenol in a solution formed from 200 parts of 40% formaldehyde, 50 parts of 20% ammonia and 10 parts of 30% aqueous tartaric acid solution (2) separating the resin (3) dissolving the resulting resin in an aliphatic solvent (4) separately dissolving a resin of the class consisting of coumarone resin and indene resin in an aromatic solvent (5) mixing the two resin solutions using from 3 to 2 parts by weight of the phenol formaldehyde resin to 1 to 2 parts of the other resin.

3. The method of claim 2 in which the aliphatic solvent is a mixture of acetone and butenol.

4. The method of claim 2 in which the aromatic solvent is benzene.

LOUIS RENÉ JOSEPH KIENTZ.